US012676118B2

(12) United States Patent
Kim et al.

(10) Patent No.: US 12,676,118 B2
(45) Date of Patent: Jul. 7, 2026

(54) ELECTRONIC DEVICE

(71) Applicant: Samsung Display Co., LTD., Yongin-si (KR)

(72) Inventors: Wontae Kim, Yongin-si (KR); Jae-Han Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/031,535

(22) Filed: Jan. 18, 2025

(65) Prior Publication Data

US 2025/0356808 A1 Nov. 20, 2025

(30) Foreign Application Priority Data

May 17, 2024 (KR) ........................ 10-2024-0064435

(51) Int. Cl.
*G09G 3/32* (2016.01)
*G09G 3/3258* (2016.01)
*G09G 3/20* (2006.01)

(52) U.S. Cl.
CPC ......... *G09G 3/3258* (2013.01); *G09G 3/2092* (2013.01); *G09G 2300/0804* (2013.01); *G09G 2300/0819* (2013.01); *G09G 2300/0842* (2013.01); *G09G 2310/06* (2013.01); *G09G 2330/023* (2013.01)

(58) Field of Classification Search
CPC ............... G09G 3/3258; G09G 3/2092; G09G 2300/0804; G09G 2300/0819; G09G 2300/0842; G09G 2310/06; G09G 2330/023
See application file for complete search history.

(56) References Cited

U.S. PATENT DOCUMENTS

| | | | |
|---|---|---|---|
| 10,991,301 B2 | 4/2021 | Lee et al. | |
| 11,386,853 B2 | 7/2022 | Lee et al. | |
| 11,475,861 B2 | 10/2022 | Kim et al. | |
| 2024/0038144 A1* | 2/2024 | Yeo ...................... | G09G 3/3275 |

FOREIGN PATENT DOCUMENTS

| | | |
|---|---|---|
| KR | 1020190069180 A | 6/2019 |
| KR | 1020220043994 A | 4/2022 |

* cited by examiner

*Primary Examiner* — Michael A Faragalla
(74) *Attorney, Agent, or Firm* — CANTOR COLBURN LLP

(57) ABSTRACT

An electronic device includes: a display panel and a data driver configured to output a plurality of data voltages to the display panel. The display panel includes a plurality of pixels and a plurality of data lines electrically connected to the plurality of pixels. The display panel is selectively driven in a first mode or a second mode, the plurality of data lines are configured to receive the plurality of data voltages, respectively, from the data driver in the first mode, the display panel or the data driver includes a switch part electrically connected to the plurality of data lines, and the plurality of data lines are configured to receive a predetermined voltage through the switch part in the second mode.

17 Claims, 14 Drawing Sheets

ELECTRONIC DEVICE

This application claims priority to Korean Patent Application No. 10-2024-0064435, filed on May 17, 2024 and all the benefits accruing therefrom under 35 U.S.C. § 119, the content of which in its entirety is herein incorporated by reference.

BACKGROUND

1. Field

The present disclosure relates to an electronic device with reduced power consumption and improved display quality.

2. Description of Related Art

Multimedia electronic devices, such as televisions, mobile phones, tablet computers, navigation devices, and game devices, include a display device displaying an image. The display device includes a display panel and a driver. The driver includes a gate driver applying gate signals to gate lines and a data driver applying data voltages to data lines.

SUMMARY

The present disclosure provides an electronic device with reduced power consumption and improved display quality.

Embodiments of the invention provide an electronic device including a display panel and a data driver configured to output a plurality of data voltages to the display panel. The display panel includes a plurality of pixels and a plurality of data lines electrically connected to the plurality of pixels. The display panel is selectively driven in a first mode or a second mode, the plurality of data lines are configured to receive the plurality of data voltages, respectively, from the data driver in the first mode, the display panel or the data driver includes a switch part electrically connected to the plurality of data lines, and the plurality of data lines are configured to receive a predetermined voltage through the switch part in the second mode.

The electronic device may further include a power supply chip configured to provide the predetermined voltage to the display panel and a power supply line to which the predetermined voltage is applied from the power supply chip, and the power supply chip may be electrically connected to the power supply line.

The display panel may include a display area in which the plurality of pixels are arranged and a non-display area adjacent to the display area, and the power supply line may be disposed in the non-display area to surround at least a portion of the display area and be electrically connected to one end of each of the plurality of data lines.

The plurality of data lines may include a plurality of first ends, respectively, and a plurality of second ends opposite to the plurality of first ends, respectively, the plurality of data voltages may be applied to the plurality of data lines through the plurality of first ends, respectively, in the first mode, and the predetermined voltage may be applied to the plurality of data lines through the plurality of second ends in the second mode.

The switch part may be provided in the display panel and include a plurality of switches electrically connected to one end of each of the plurality of data lines, respectively, the display panel may further include at least one control line to control an operation of the plurality of switches, the plurality of switches may be turned off in the first mode, and the plurality of switches may be turned on in the second mode to allow the power supply line to be electrically connected to the plurality of data lines via the plurality of switches.

The data driver may include a plurality of amplifiers connected to the plurality of data lines, respectively, and a plurality of switches disposed on paths through which the plurality of data lines are connected to the plurality of amplifiers, respectively.

The plurality of switches of the data driver may be turned on in the first mode, and the plurality of switches of the data driver may be turned off in the second mode.

The data driver may be turned off in the second mode.

The switch part may be provided in the data driver and include a plurality of first switches electrically connected to the plurality of data lines, respectively, and the plurality of data lines may receive the predetermined voltage through the plurality of first switches.

The data driver may further include a first amplifier electrically connected to all of the plurality of data lines through the plurality of first switches, a plurality of second amplifiers electrically connected to the plurality of data lines, respectively, and a plurality of second switches disposed between the plurality of data lines and the plurality of second amplifiers, respectively.

The plurality of data voltages may be output from the plurality of second amplifiers and applied to the plurality of data lines, respectively, in the first mode, and the predetermined voltage may be output from the first amplifier and applied to at least a portion of the plurality of data lines in the second mode.

The plurality of first switches of the data driver may be turned off in the first mode, the plurality of second switches may be turned on in the first mode, the plurality of first switches of the data driver may be turned on in the second mode, and the plurality of second switches may be turned off in the second mode.

The electronic device further may include a plurality of driving chips, and the data driver may be disposed in each of a plurality of driving chips.

Embodiments of the invention provide an electronic device including a display panel configured to operate in a first mode or a second mode different from the first mode and a data driver configured to receive an output image signal and including a mode determiner configured to determine an operation mode of the display panel. The display panel includes a plurality of pixels and a plurality of data lines electrically connected to the plurality of pixels. The plurality of data lines receive a plurality of data voltages, respectively, from the data driver in the first mode, and at least a portion of the plurality of data lines receives a predetermined voltage in the second mode.

The electronic device may further include a power supply chip electrically connected to the display panel and configured to provide the predetermined voltage.

The display panel further may include a switch part electrically connected to the plurality of data lines and a power supply line configured to receive the predetermined voltage from the power supply chip, and the switch part may be configured to control a connection between the power supply line and the plurality of data lines.

The data driver may further include a plurality of amplifiers connected to the plurality of data lines, respectively, and a plurality of switches disposed on paths through which the plurality of data lines are connected to the plurality of amplifiers, respectively.

The switch part may be turned off in the first mode, the plurality of switches may be turned on in the first mode, the plurality of data lines may receive the plurality of data voltages from the plurality of amplifiers, respectively, in the first mode, the switch part may be turned on in the second mode, the switches may be turned off in the second mode, and the plurality of data lines may receive the predetermined voltage from the power supply chip in the second mode.

The data driver may further include a first switch part electrically connected to the plurality of data lines, a first amplifier electrically connected to the plurality of data lines through the first switch part, a plurality of second amplifiers electrically connected to the plurality of data lines, respectively, and a second switch part disposed between the plurality of data lines and the plurality of second amplifiers. The plurality of data voltages may be output from the plurality of second amplifiers and applied to the plurality of data lines, respectively, in the first mode, and the predetermined voltage may be output from the first amplifier and applied to the at least a portion of the plurality of data lines in the second mode.

The first switch part may be turned off in the first mode, the second switch part may be turned on in the first mode, the first switch part may be turned on in the second mode, and the second switch part may be turned off in the second mode.

According to the above, the data voltage is not applied from the data driver, and the predetermined voltage is applied from the power supply chip disposed outside of the display panel in the electronic device. Thus, the data driver is turned off or is driven in a low power mode. Accordingly, the power consumption of the electronic device is effectively reduced.

According to the above, the data voltage is commonly applied to the data lines from the power supply chip. Therefore, when sensing a threshold voltage, certain output differences between the data drivers respectively disposed in the driving chips are not considered. Thus, the accuracy of a measurement value of the threshold voltage is effectively improved, and a compensation accuracy based on the measured threshold voltage is effectively improved. Accordingly, the display quality of the electronic device is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
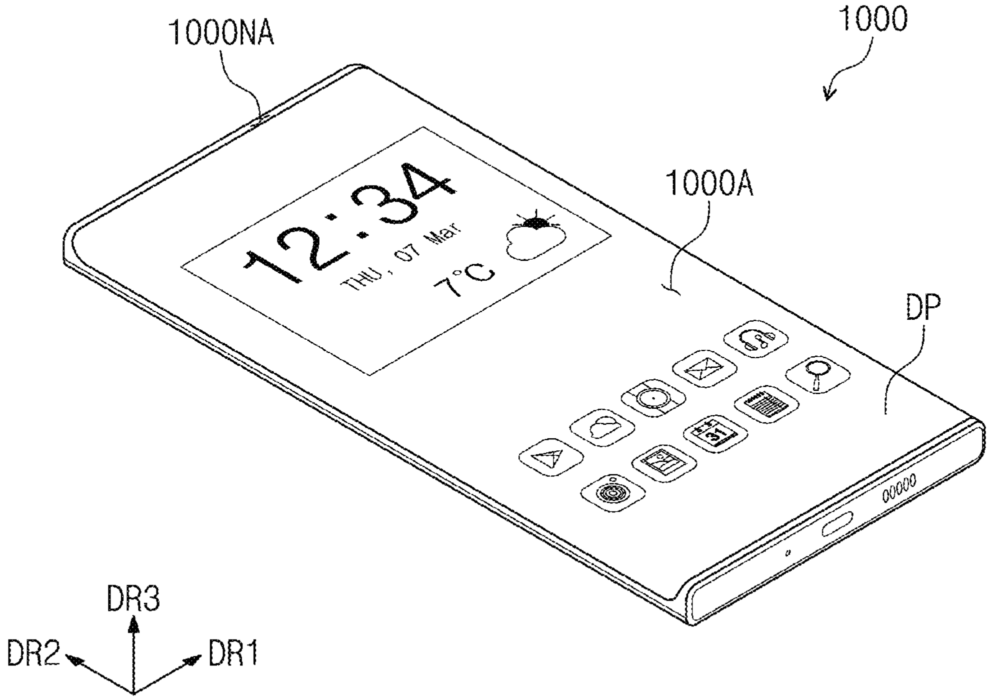
FIG. 1 is a perspective view of an electronic device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms "first", "second", etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "part" or "unit" as used herein is intended to mean a software component or a hardware component that performs a specific function. The hardware component may include, for example, a field-programmable gate array (FPGA) or an application-specific integrated circuit (ASIC). The software component may refer to an executable code and/or data used by the executable code in an addressable storage medium. Thus, the software components may be, for example, object-oriented software components, class components, and task components, and may include processes, functions, attributes, procedures, subroutines, segments of program code, drivers, firmware, micro codes, circuits, data, a database, data structures, tables, arrays, or variables.

Hereinafter, embodiments of the present disclosure will be described with reference to accompanying drawings.

FIG. 1 is a perspective view of an electronic device 1000 according to an embodiment of the present disclosure.

Referring to FIG. 1, the electronic device 1000 may be activated in response to electrical signals. For example, the electronic device 1000 may be a small and medium-sized device, such as a mobile phone, a foldable mobile phone, a car navigation unit, a game unit, or a wearable device, however, it should not be limited thereto or thereby. In FIG. 1, the mobile phone is shown as a representative example of the electronic device 1000.

The electronic device 1000 may include an active area 1000A and a peripheral area 1000NA, which are defined therein. The electronic device 1000 may display an image through the active area 1000A. The active area 1000A may include a surface defined by a first direction DR1 and a second direction DR2. The peripheral area 1000NA may surround the active area 1000A.

A thickness direction of the electronic device 1000 may be substantially parallel to a third direction DR3 intersecting the first direction DR1 and the second direction DR2. Accordingly, front (or upper) and rear (or lower) surfaces of each member of the electronic device 1000 may be defined with respect to the third direction DR3.

The electronic device 1000 may include a display panel DP. The display panel DP may display the image and may sense inputs applied thereto from an outside of the electronic device 1000. According to an embodiment, one or more circuit films on which a data driving chip is mounted may be attached to the display panel DP.

Figure 2:
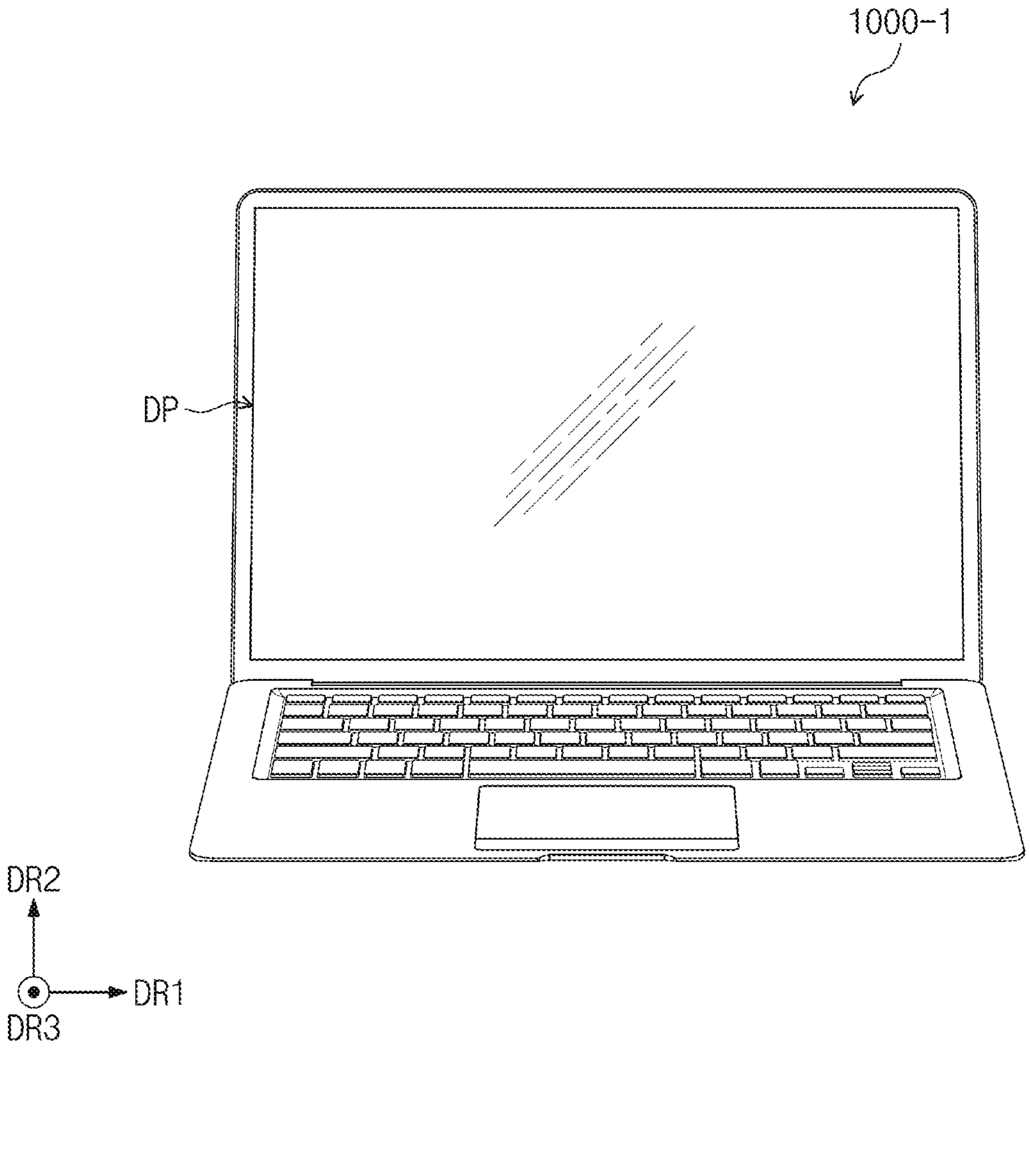
FIG. 2 is a perspective view of an electronic device according to an embodiment of the present disclosure.

FIG. 2 is a perspective view of an electronic device 1000-1 according to an embodiment of the present disclosure.

Referring to FIG. 2, the electronic device 1000-1 may be activated in response to electrical signals. For example, the electronic device 1000-1 may be a medium and large-sized device, such as a notebook computer or a television, however, it should not be limited thereto or thereby. In FIG. 2, the notebook computer is shown as a representative example of the electronic device 1000-1.

The electronic device 1000-1 may include a display panel DP. The display panel DP may display an image and may sense inputs applied thereto from an outside of the electronic device 1000-1. According to an embodiment, one or more circuit films each on which a data driving chip is mounted may be attached to the display panel DP.

Figure 3:
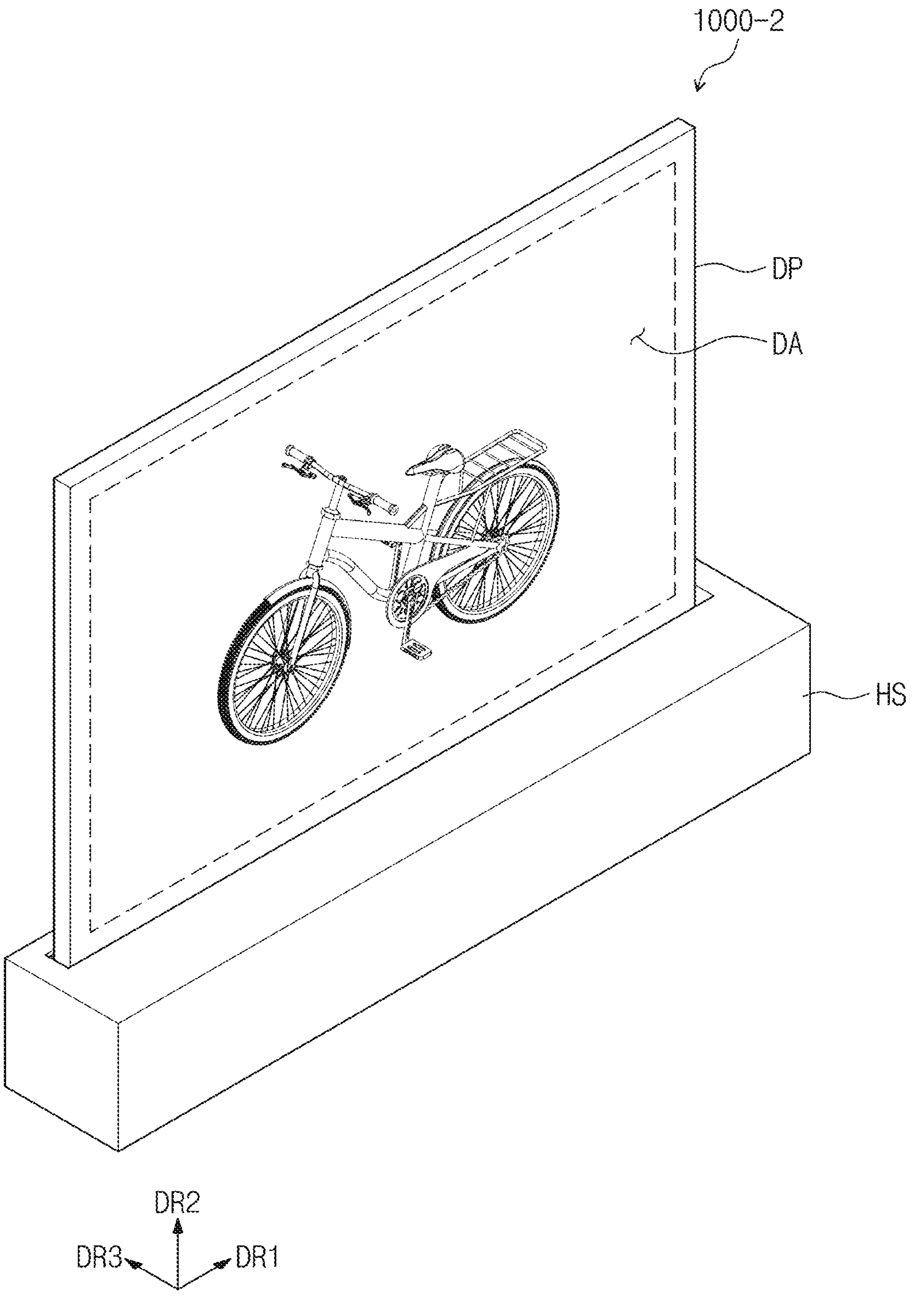
FIG. 3 is a perspective view of an electronic device according to an embodiment of the present disclosure.

FIG. 3 is a perspective view of an electronic device 1000-2 according to an embodiment of the present disclosure.

Referring to FIG. 3, the electronic device 1000-2 may be activated in response to electrical signals. In FIG. 3, a rollable electronic device is shown as a representative example of the electronic device 1000-2. The electronic device 1000-2 may be applied to other electronic items as long as they do not depart from the concept of the present disclosure.

The electronic device 1000-2 may include a display panel DP. As an example, the display panel DP may have a small or medium size of a few inches or a dozen inches or less. As another example, the display panel DP may have a large size of tens of inches or more. When the display panel DP has the small or medium size, one circuit film on which a data driving chip is mounted may be attached to the display panel DP, and when the display panel DP has the large size, one or more circuit films each on which a data driving chip is mounted may be attached to the display panel DP.

The electronic device 1000-2 may further include a housing HS. In FIG. 3, the housing HS is shown as a rectangular parallelepiped, including edges extending in the first direction DR1, the second direction DR2, and the third direction DR3, however, the shape of the housing HS should not be limited thereto or thereby. The shape of the housing HS may be changed in various ways as long as the housing HS accommodates the display panel DP.

The display panel DP may enter and exit through an open area of an upper surface of the housing HS. The display panel DP may be completely accommodated in the housing HS, may be accommodated in the housing HS to allow a display area DA of the display panel DP to be partially exposed to the outside of the housing HS, or may be accommodated in the housing HS to allow the display area DA of the display panel DP to be entirely exposed to the outside of the housing HS. FIG. 3 shows a state in which the display area DA of the display panel DP is entirely exposed to the outside of the housing HS.

Figure 4:
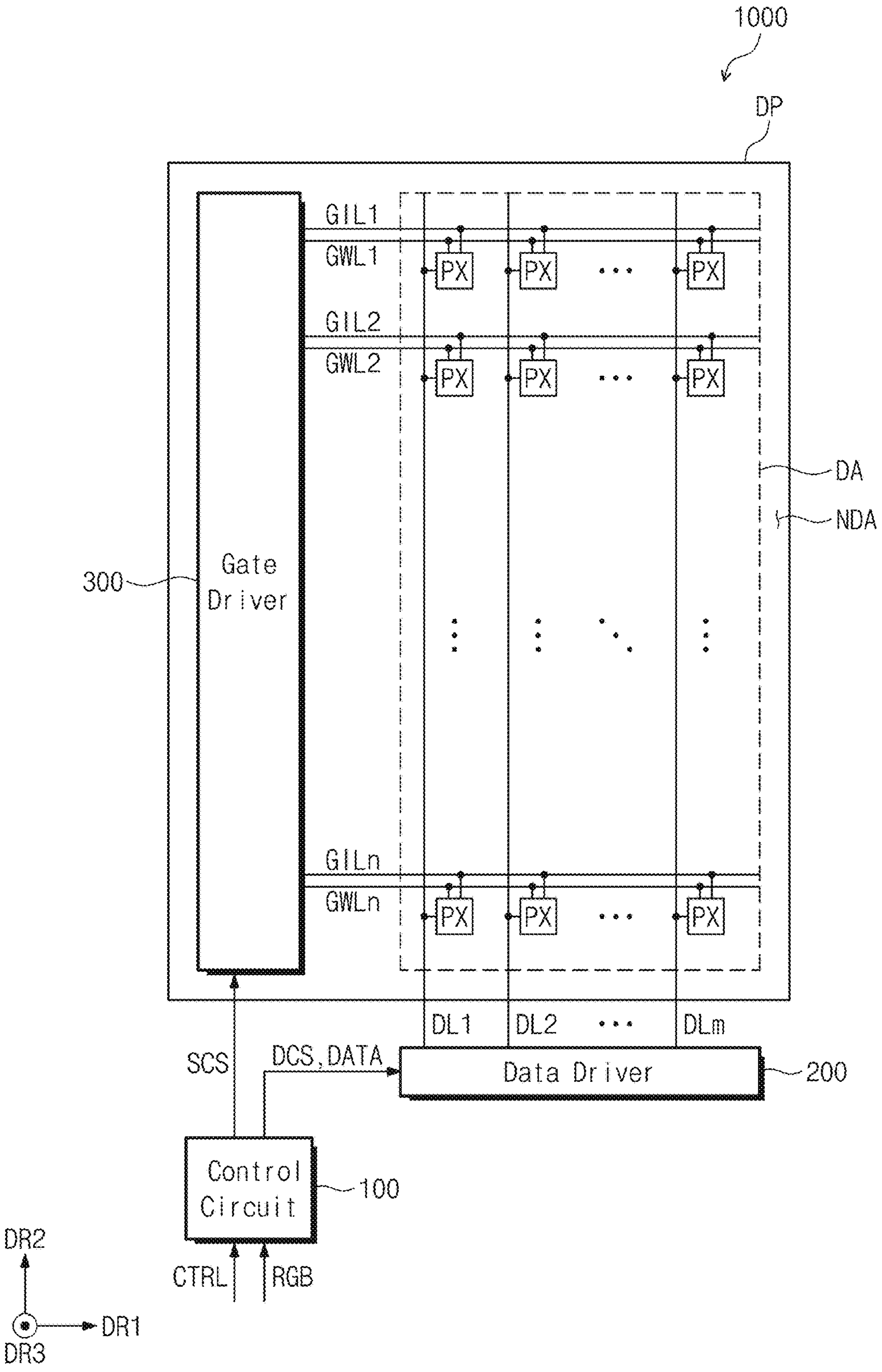
FIG. 4 is a block diagram of an electronic device according to an embodiment of the present disclosure.

FIG. 4 is a block diagram of the electronic device 1000 according to an embodiment of the present disclosure.

Referring to FIG. 4, the electronic device 1000 may include the display panel DP, a control circuit 100, a data driver 200, and a gate driver 300.

The control circuit 100 may receive input image signals RGB and control signals CTRL. The control circuit 100 may convert a data format of the input image signals RGB to a data format appropriate to an interface between the data driver 200 and the control circuit 100 to generate output image signals DATA. The control circuit 100 may output a gate driving signal SCS and a data driving signal DCS.

The display panel DP may include a display area DA and a non-display area NDA, which are defined therein. The display panel DP may include a plurality of gate lines GIL1 to GILn and GWL1 to GWLn, a plurality of data lines DL1 to DLm, and a plurality of pixels PX. The gate lines GIL1 to GILn may be referred to as initialization gate lines GIL1 to GILn, and the gate lines GWL1 to GWLn may be referred to as write gate lines GWL1 to GWLn.

The pixels PX may be arranged in the display area DA. Each of the pixels PX may include a light emitting element EE (refer to FIG. 5) and a pixel circuit PXC (refer to FIG. 5) controlling a light emission of the light emitting element EE. The pixel circuit PXC may include one or more thin film transistors and one or more capacitors.

The gate driver 300 may be included in the display panel DP. However, the present invention is not limited thereto. The gate driver 300 may be disposed in the non-display area NDA, however it should not be particularly limited. As an example, at least a portion of the gate driver 300 may be disposed in the display area DA, and in this case, at least one of the pixels PX may overlap the gate driver 300. The gate driver 300 may include thin film transistors formed through the same process as the pixel circuit PXC.

The gate driver 300 may receive the gate driving signal SCS from the control circuit 100. The gate driver 300 may be disposed adjacent to a first side of the display panel DP. The gate lines GIL1 to GILn and GWL1 to GWLn may extend from the gate driver 300 to the first direction DR1.

The gate driver 300 may output gate signals to the gate lines GIL1 to GILn and GWL1 to GWLn in response to the gate driving signal SCS.

Each of the pixels PX may be electrically connected to two gate lines and one data line. As an example, as shown in FIG. 4, pixels arranged in a first row among the pixels PX may be connected to the gate lines GIL1 and GWL1. Among the pixels PX, pixels arranged in a second row may be connected to gate lines GIL2 and GWL2. In addition, among the pixels PX, pixels arranged in an n-th row may be connected to the gate lines GILn and GWLn.

According to an embodiment, each of the control circuit 100 and the data driver 200 may be directly mounted in a predetermined area of the display panel DP after being implemented in an integrated circuit (IC) or may be electrically connected to the display panel DP after being mounted on a separate printed circuit board in a chip-on-film (COF) manner. According to the present disclosure, the control circuit 100 and the data driver 200 may be implemented as separate chips or may be implemented as a single chip (e.g., driving chip RSIC in FIG. 6A).

The data lines DL1 to DLm may be electrically connected to the data driver 200. The data lines DL1 to DLm may extend in the second direction DR2, and the data lines DL1 to DLm may be arranged spaced apart from each other in the first direction DR1.

The data driver 200 may receive the data control signal DCS and the output image signals DATA from the control circuit 100. The data driver 200 may convert the output image signals DATA to data signals and may output the data signals to the data lines DL1 to DLm. The data signals may be analog voltages corresponding to grayscale values of the output image signals DATA.

Figure 5:
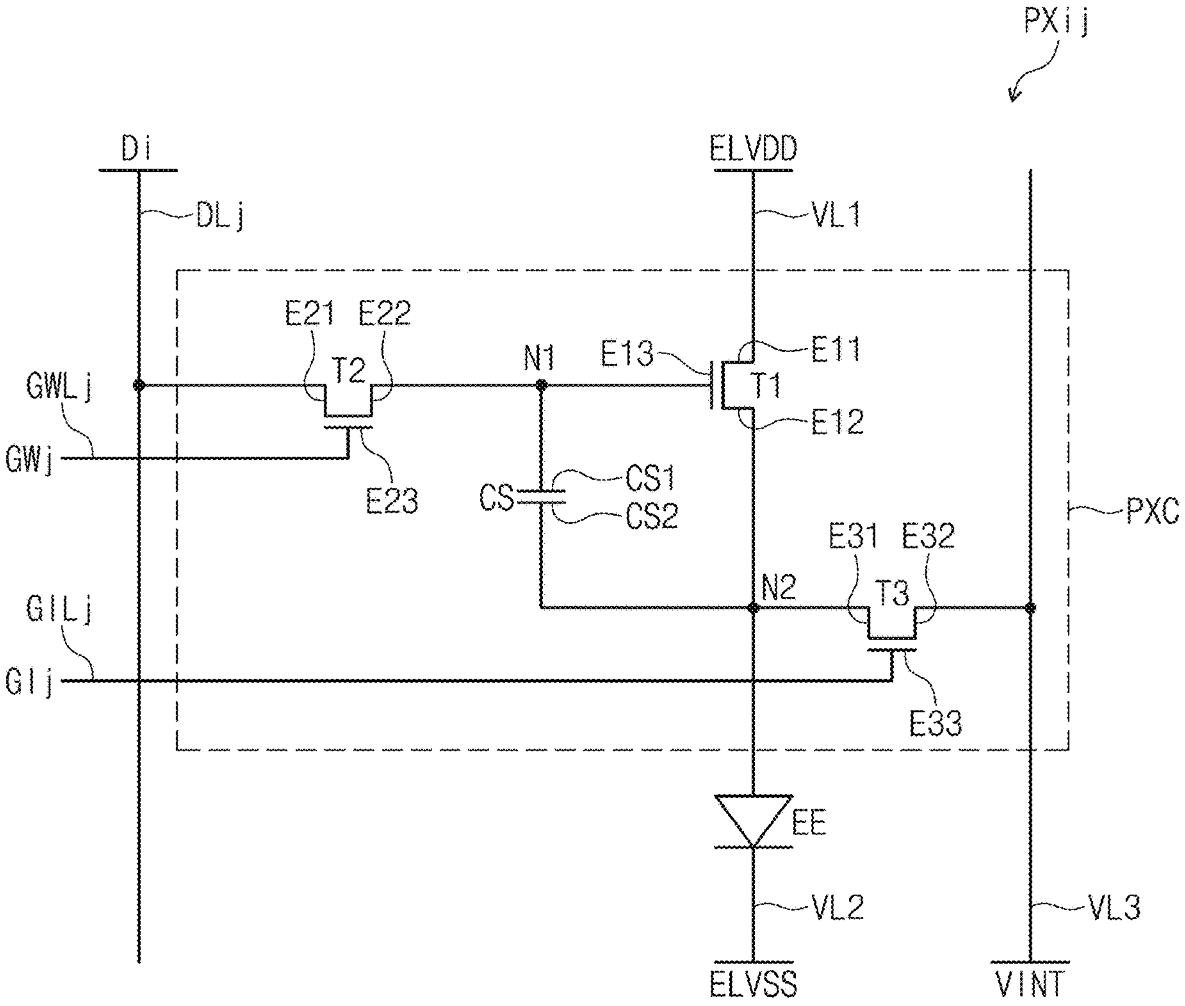
FIG. 5 is an equivalent circuit diagram of a pixel according to an embodiment of the present disclosure.

FIG. 5 is an equivalent circuit diagram of a pixel PXij according to an embodiment of the present disclosure.

Referring to FIGS. 4 and 5, an equivalent circuit diagram of the pixel PXij connected to an i-th data line DLi among the data lines DL1 to DLm, j-th gate lines GILj and GWLj among the gate lines GIL1 to GILn and GWL1 to GWLn is shown. Each of the pixels PX shown in FIG. 4 may have substantially the same circuit configuration as a circuit configuration of the equivalent circuit diagram of the pixel PXij shown in FIG. 5.

The pixel circuit PXC may include first, second, and third thin film transistors T1, T2, and T3 and a capacitor CS. The pixel PXij shown in FIG. 5 is merely an example, and the circuit configuration of the pixel PXij may be changed.

Each of the first, second, and third thin film transistors T1, T2, and T3 may be an N-type thin film transistor including an oxide semiconductor layer. The first thin film transistor T1 may serve as a driving thin film transistor, the second thin film transistor T2 may serve as a switching thin film transistor, and the third thin film transistor T3 may serve as an initialization thin film transistor.

The j-th gate lines GILj and GWLj may transmit gate signals GIj and GWj, respectively. The i-th data line DLi may transmit a data signal Di. The data signal Di may have a voltage level corresponding to the input image signal RGB applied to the electronic device 1000.

First, second, and third driving voltage lines VL1, VL2, and VL3 may transmit a first driving voltage ELVDD, a second driving voltage ELVSS, and an initialization voltage VINT, respectively, to the pixel PXij.

The first thin film transistor T1 may include a first electrode E11 electrically connected to the first driving voltage line VL1, a second electrode E12 electrically connected to an anode of the light emitting element EE, and a gate electrode E13. A portion at which the second electrode E12 of the first thin film transistor T1 is connected to the light emitting element EE may be defined as a second node N2.

The second thin film transistor T2 may include a first electrode E21 connected to the data line DLi, a second electrode E22 connected to a first node N1, and a gate electrode E23 connected to the gate line GWLj. The second thin film transistor T2 may transmit the data signal Di applied thereto through the data line DLi to the first node N1 in response to the gate signal GWj applied thereto through the gate line GWLj.

The capacitor CS may be connected between the first node N1 and the second node N2. A first opposite electrode CS1 of the capacitor CS may be connected to the first node N1, and a second opposite electrode CS2 of the capacitor CS may be connected to the second node N2.

The third thin film transistor T3 may include a first electrode E31 connected to the third driving voltage line VL3, a second electrode E32 connected to the second node N2, and a gate electrode E33 connected to the gate line GILj. The third thin film transistor T3 may transmit the initialization voltage VINT applied thereto through the third driving voltage line VL3 to the second node N2 in response to the gate signal GIj applied thereto through the gate line GILj.

The light emitting element EE may include the anode connected to the second electrode E12 of the first thin film transistor T1 and the second node N2 and a cathode connected to the second driving voltage line VL2. The light emitting element EE may be an organic light emitting diode including an organic light emitting layer, however, it should not be particularly limited.

Figure 6A:
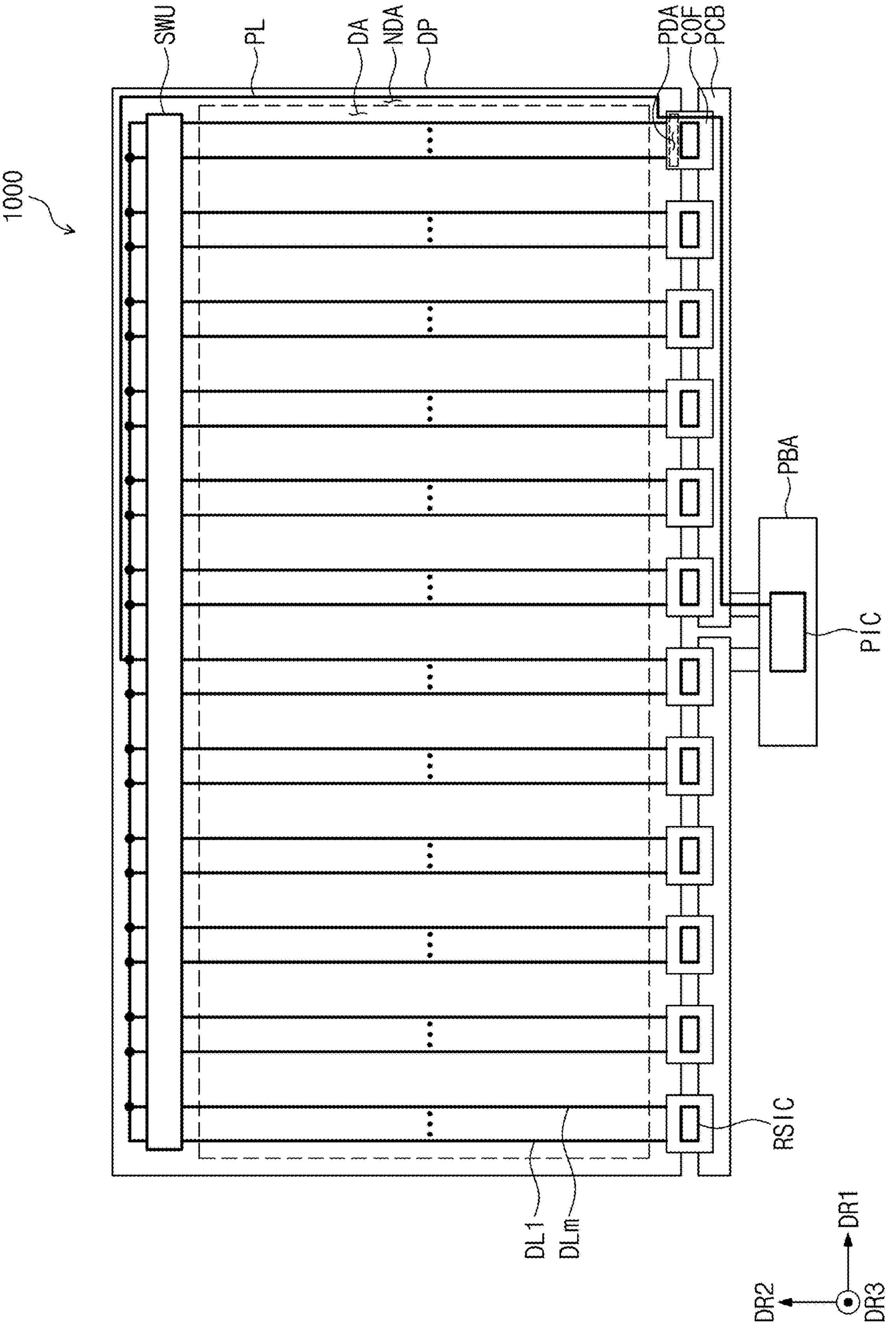
FIG. 6A is a plan view of a portion of an electronic device according to an embodiment of the present disclosure.

FIG. 6A is a plan view of a portion of the electronic device 1000 according to an embodiment of the present disclosure.

Referring to FIGS. 4 and 6A, the electronic device 1000 may include the display panel DP, a plurality of circuit films COF, a plurality of circuit boards PCB, and a printed circuit board assembly PBA.

FIG. 6A shows some components of the display panel DP. The display panel DP may include the data lines DL1 to DLm, a switch part SWU, and a power supply line PL.

The switch part SWU may be disposed in the non-display area NDA, however, this is merely an example. According to an embodiment, the switch part SWU may be disposed in the display area DA. The power supply line PL may be disposed in the non-display area NDA of the display panel DP and may surround a portion of the display area DA. The power supply line PL may be electrically connected to one end of each of the data lines DL1 to DLm. Therefore, the switch part SWU may control connections between the data lines DL1 to DLm and the power supply line PL.

The display panel DP may selectively operate in a first mode or a second mode. The first mode may be a normal driving mode in which the data lines DL1 to DLm receive the data voltages, respectively, from the data driver 200 to display the image. The second mode may be an external power supply driving mode in which the data lines DL1 to DLm receive a common voltage through the power supply line PL.

The data lines DL1 to DLm may be electrically connected to the power supply line PL via the switch part SWU. As an example, the data lines DL1 to DLm may receive signals from the power supply line PL via the switch part SWU in the second mode. The data lines DL1 to DLm may be disconnected from the power supply line PL by the switch part SWU in the first mode.

In the second mode, all the data lines DL1 to DLm may receive a predetermined voltage from the power supply line PL via the switch part SWU.

According to an embodiment, only a portion of the data lines DL1 to DLm may be connected to the power supply line PL by the switch part SWU. As an example, a portion of the data lines DL1 to DLm may receive a first voltage from the power supply line PL via the switch part SWU at a first timing of the second mode, and another portion of the data lines DL1 to DLm may receive a second voltage from the power supply line PL via the switch part SWU at a second timing of the second mode, and the other portion of the data lines DL1 to DLm may receive a third voltage from the power supply line PL via the switch part SWU at a third timing of the second mode.

The circuit films COF may be arranged in the first direction DR1 and may be coupled with the display panel DP in the non-display area NDA. As an example, the circuit films COF may be attached to one side of the display panel DP.

The circuit films COF may be coupled with the display panel DP in a pad area PDA. The pad area PDA may be defined in the non-display area NDA of the display panel DP. The circuit films COF may be coupled with the display panel DP by an anisotropic conductive film (ACF), however, they should not be limited thereto or thereby.

Driving chips RSIC may be mounted on the circuit films COF, respectively, to drive the display panel DP. The driving chips RSIC may transmit the data voltages to the data lines DL1 to DLm, respectively. As an example, the driving chips RSIC may include the data driver 200 described with reference to FIG. 4.

The circuit board PCB may be provided in plural. Each of the circuit boards PCB may be electrically connected to the display panel DP through a corresponding circuit film among the circuit films COF.

The printed circuit board assembly PBA may be connected to the circuit boards PCB. A power supply chip PIC may be mounted on the printed circuit board assembly PBA. In the second mode, the power supply chip PIC may be electrically connected to the data lines DL1 to DLm through the power supply line PL to apply the predetermined voltage to at least a portion of the data lines DL1 to DLm. The power supply line PL may be connected to the power supply chip PIC via one circuit film COF and one circuit board PCB.

FIG. 6A shows twelve circuit films COF, however, the present disclosure should not be limited thereto or thereby. FIG. 6A shows two circuit boards PCB, however, the present disclosure should not be limited thereto or thereby. For instance, the number of circuit films COF and the number of circuit boards PCB may vary depending on a resolution of the display panel DP, a size of the display panel DP, and specifications of a data driver 200.

In the second mode, the data lines DL1 to DLm may not receive the data voltage from the data driver 200, i.e., the driving chips RSIC, but may receive the predetermined voltage from the power supply chip PIC. Accordingly, the driving chips RSIC may be turned off or may be driven in a low-power mode during the second mode. Therefore, a power consumption of the electronic device 1000 may be effectively reduced.

In addition, in the second mode, the display panel DP may be driven to display a black image on a screen or may be driven to apply the same voltage. In this case, the display panel DP may not receive the data voltages from the driving chips RSIC and may receive the common voltage from the power supply chip PIC in the second mode. Accordingly, even though there is a certain output difference between the driving chips RSIC, a difference in data voltage of the display panel DP may be reduced since the display panel DP receives the common voltage from the power supply chip PIC while being driven in the second mode.

Figure 6B:
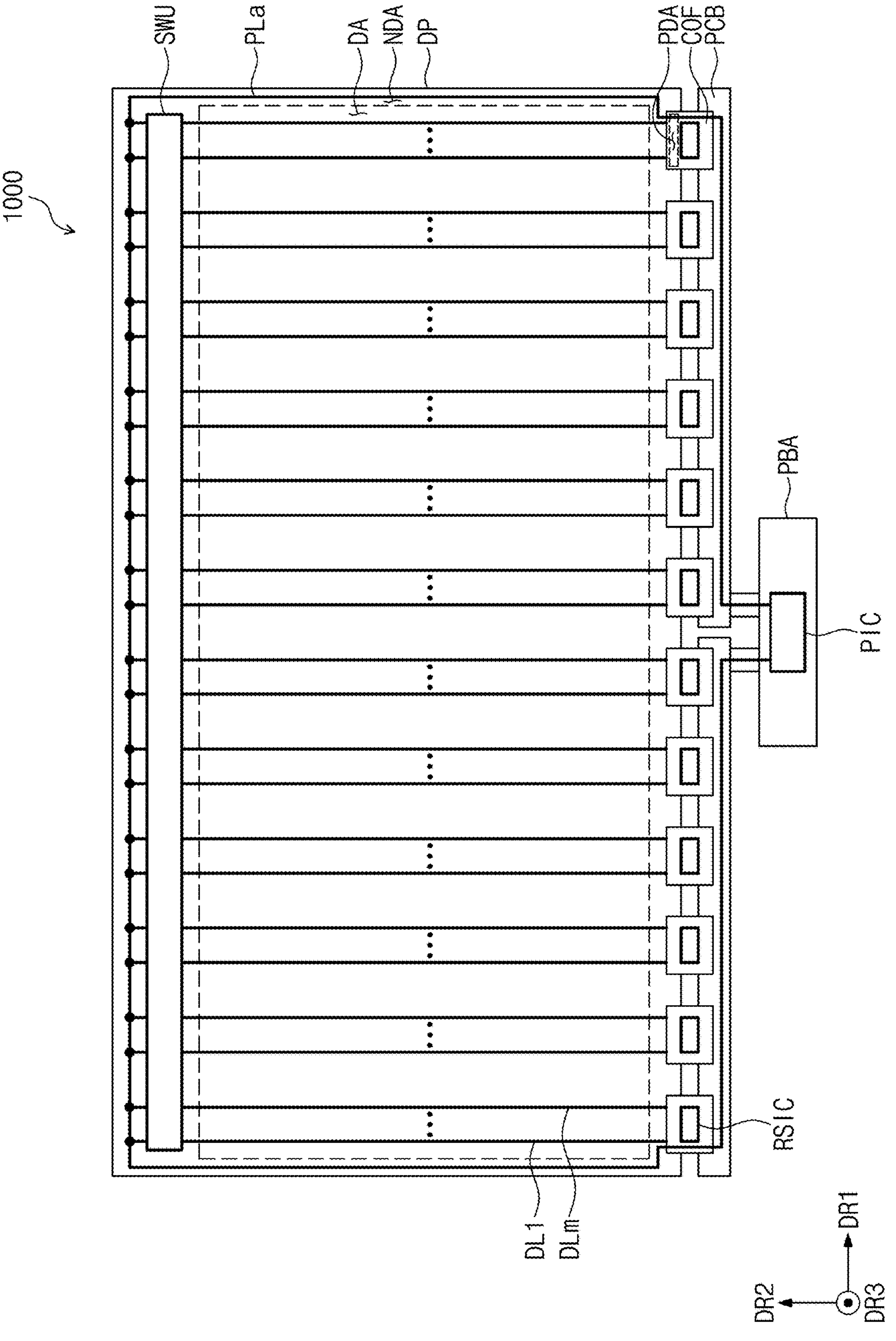
FIG. 6B is a plan view of a portion of an electronic device according to an embodiment of the present disclosure.

FIG. 6B is a plan view of a portion of an electronic device 1000 according to an embodiment of the present disclosure.

Referring to FIGS. 6A and 6B, a power supply line PLa may be disposed in a non-display area NDA of a display panel DP. As shown in FIG. 6A, the power supply line PL extends from the switch part SWU to one direction and is connected to the power supply chip PIC via the one circuit film COF and the one circuit board PCB. The power supply line PLa shown in FIG. 6B may extend from a switch part SWU to opposite directions and may be connected to a power supply chip PIC via two circuit films COF and two circuit boards PCB.

FIGS. 6A and 6B show the structure in which the driving chips RSIC are mounted on the circuit films COF, however, the present disclosure should not be limited thereto or thereby. As an example, the driving chips RSIC may be directly mounted on the display panel DP. According to an embodiment, the driving chips RSIC may be embedded into the display panel DP. According to an embodiment, the driving chips RSIC may be mounted on the circuit boards PCB. The arrangement of the driving chips RSIC may be changed in various ways as long as the driving chips RSIC apply signals to the display panel DP.

Figure 7A:
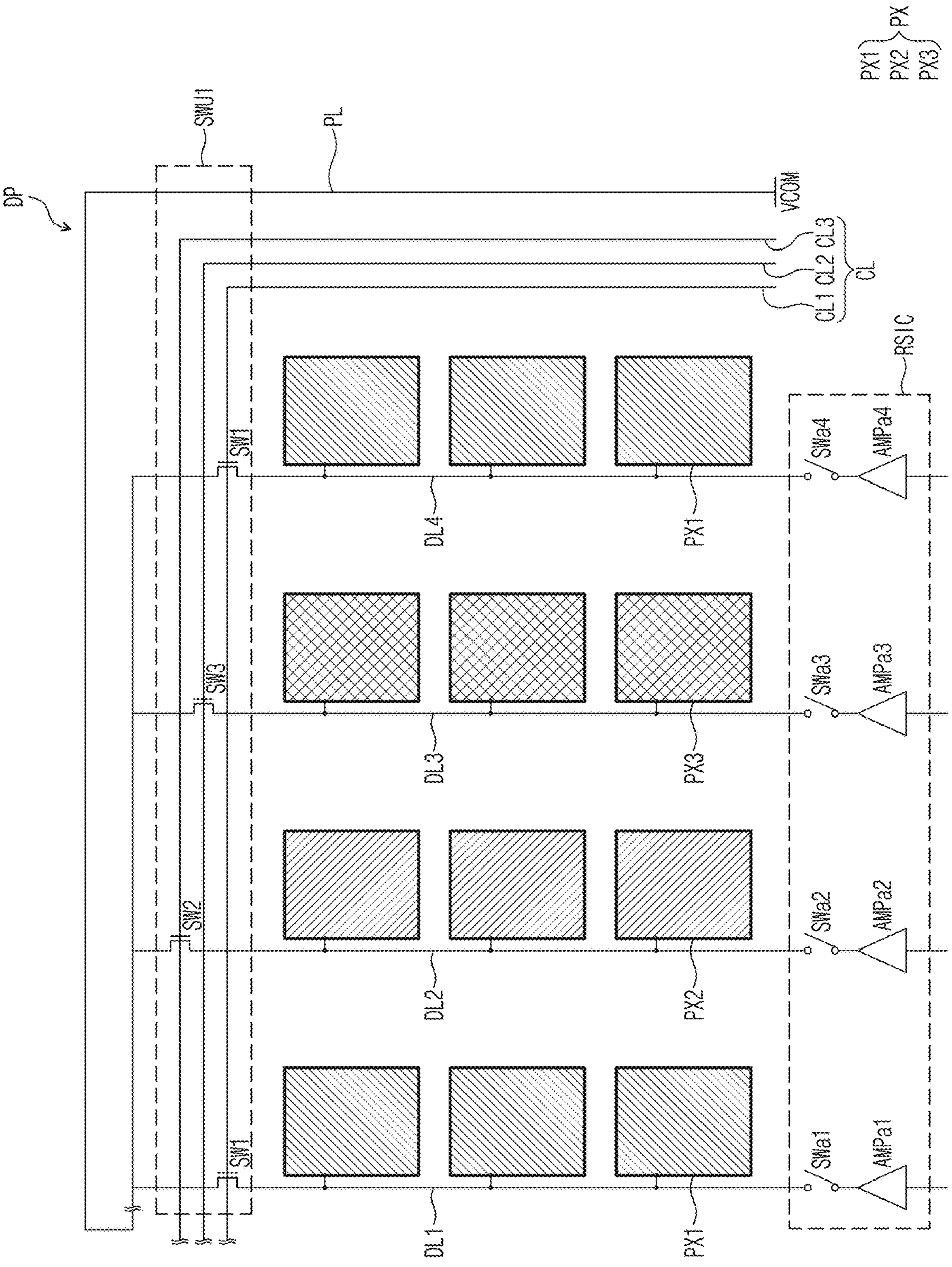
FIG. 7A is a view of a portion of a display panel and a portion of a driving chip according to an embodiment of the present disclosure.

FIG. 7A is a view of a portion of the display panel DP and a portion of the driving chip RSIC according to an embodiment of the present disclosure.

Referring to FIGS. 6A and 7A, the display panel DP may include the pixels PX, a first switch part SWU1, a plurality of control lines CL, the data lines DL1, DL2, DL3, and DL4, and the power supply line PL. The driving chip RSIC may include a second switch part SWU2 and a plurality of amplifiers AMPa1, AMPa2, AMPa3, and AMPa4.

The pixels PX may include first pixels PX1, second pixels PX2, and third pixels PX3. The first pixels PX1 may be red pixels, the second pixels PX2 may be green pixels, and the third pixels PX3 may be blue pixels.

The first switch part SWU1 may include a first switch SW1, a second switch SW2, and a third switch SW3. The control lines CL may include a first control line CL1, a second control line CL2, and a third control line CL3. The first switch SW1, the second switch SW2, and the third switch SW3 may be controlled by the first control line CL1, the second control line CL2, and the third control line CL3, respectively.

FIG. 7A shows four data lines DL1, DL2, DL3, and DL4 as a representative example. The data lines DL1, DL2, DL3, and DL4 may be electrically connected to the power supply line PL through the first switch part SWU. The switches of the first switch part SWU may be arranged on the data lines DL1, DL2, DL3, and DL4 in a one-to-one correspondence.

The second switch part SWU2 may include second switches SWa1, SWa2, SWa3, and SWa4. The second switch part SWU2 may be electrically connected to the amplifiers AMPa1, AMPa2, AMPa3, and AMPa4 and the data lines DL1, DL2, DL3, and DL4. The second switch part SWU2 may be disposed between the amplifiers AMPa1, AMPa2, AMPa3, and AMPa4 and the data lines DL1, DL2, DL3, and DL4, and the data lines DL1, DL2, DL3, and DL4 may receive the data voltages output from the amplifiers AMPa1, AMPa2, AMPa3, and AMPa4 through the second switch part SWU2. The second switches SWa1, SWa2, SWa3, and SWa4 of the second switch part SWU2 may be disposed at the data lines DL1, DL2, DL3, and DL4, respectively, and the amplifiers AMPa1, AMPa2, AMPa3, and AMPa4 may be disposed at the data lines DL1, DL2, DL3, and DL4, respectively. The number of the second switches SWa1, SWa2, SWa3, and SWa4 of the second switch part SWU2 and the number of the amplifiers AMPa1, AMPa2, AMPa3, and AMPa4 may be the same as the number of the data lines DL1, DL2, DL3, and DL4.

Referring to FIGS. 6A and 7A, the display panel DP may be selectively driven in the first mode or the second mode. The first mode may be the normal driving mode in which the data lines DL1, DL2, DL3, and DL4 receive the data voltage output from the amplifiers AMPa1, AMPa2, AMPa3, and AMPa4. The second mode may be the external power supply driving mode in which the data lines DL1, DL2, DL3, and DL4 receive the predetermined voltage VCOM via the power supply line PL and the first switch part SWU1.

Referring to FIGS. 6A and 7A, the first switch part SWU1 and the second switch part SWU2 may be selectively turned on or turned off depending on the first mode and the second mode. In the first mode, all the first switch SW1, the second switch SW2, and the third switch SW3 of the first switch part SWU1 may be turned off and at least one switch of the switches of the second switch part SWU2 may be turned on. In the second mode, at least one of the first switch SW1, the second switch SW2, and the third switch SW3 of the first switch part SWU1 may be turned on and all the switches of the second switch part SWU2 may be turned off.

In the second mode, the first pixels PX1, the second pixels PX2, and the third pixels PX3 may receive the first voltage, the second voltage, and the third voltage, respectively, through the power supply line PL. The first voltage, the second voltage, and the third voltage may be different from each other. In this case, timings at which the first switch SW1, the second switch SW2, and the third switch SW3 are turned on may be different from each other, however, the present disclosure should not be limited thereto or thereby. According to an embodiment, at least two of the first voltage, the second voltage, and the third voltage may be the same as each other. In this case, at least two of the first switch SW1, the second switch SW2, and the third switch SW3 may be turned on at the same timing at which the same voltage is applied thereto.

Figure 7B:
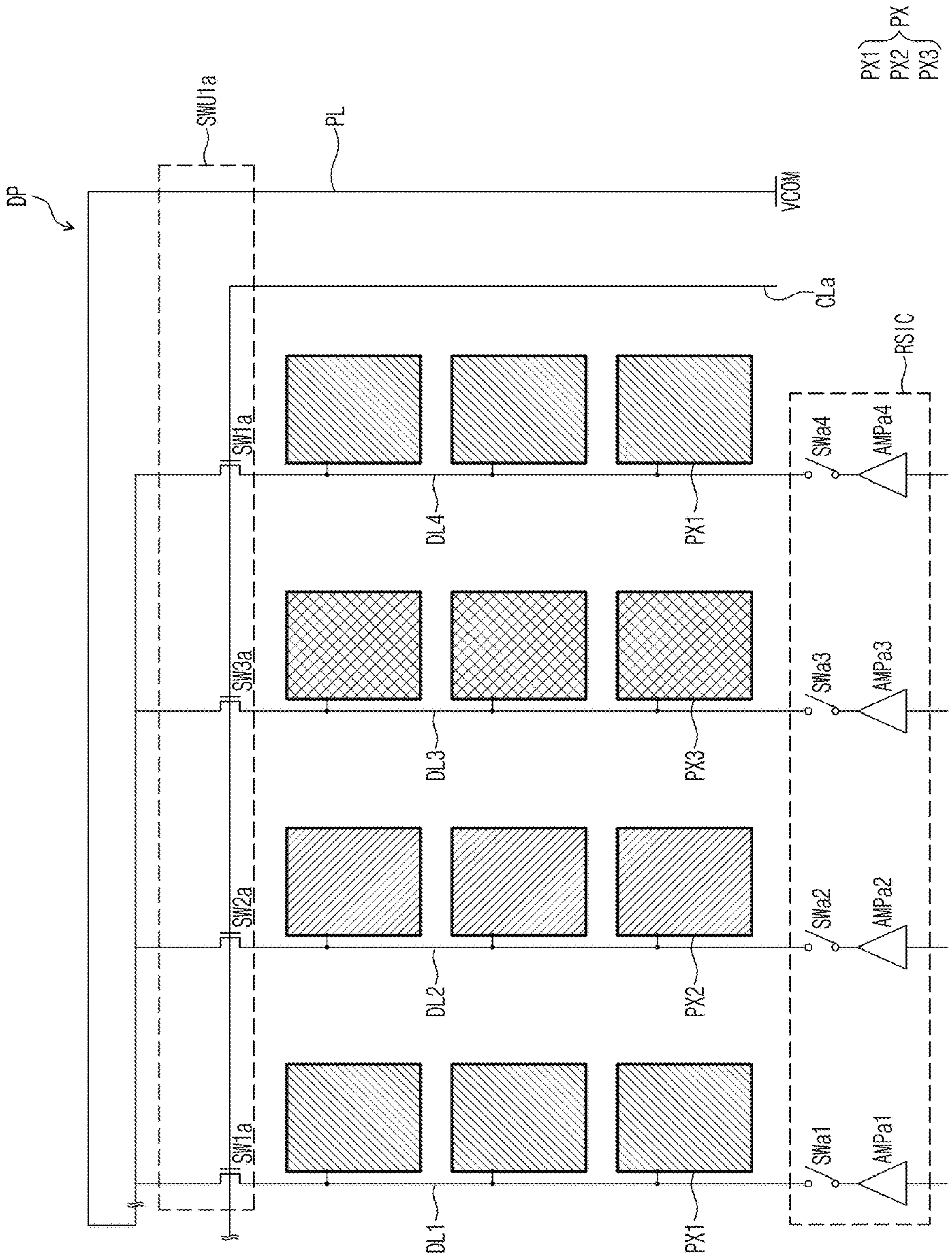
FIG. 7B is a circuit diagram of a display panel according to an embodiment of the present disclosure.

FIG. 7B is a circuit diagram of a display panel DP according to an embodiment of the present disclosure.

Referring to FIG. 7B, the display panel DP may include a first switch part SWU1*a* and one control line CLa. The first switch part SWU1*a* may include a first switch SW1*a*, a second switch SW2*a*, and a third switch SW3*a*.

The first switch SW1, the second switch SW2, and the third switch SW3 shown in FIG. 7A may be controlled by the first control line CL1, the second control line CL2, and the third control line CL3, respectively. The first switch SW1*a*, the second switch SW2*a*, and the third switch SW3*a* shown in FIG. 7B may be connected to one control line CLa and thus may be commonly controlled.

The first switch part SWU1*a* may be selectively turned on or turned off depending on a first mode and a second mode. In the first mode, all the switches of the first switch part SWU1*a* may be turned off. In the second mode, first pixels PX1, second pixels PX2, and third pixels PX3 may receive a predetermined voltage VCOM through a power supply line PL. In this case, all the switches of the first switch part SWU1*a* may be substantially simultaneously turned on.

Figure 8A:
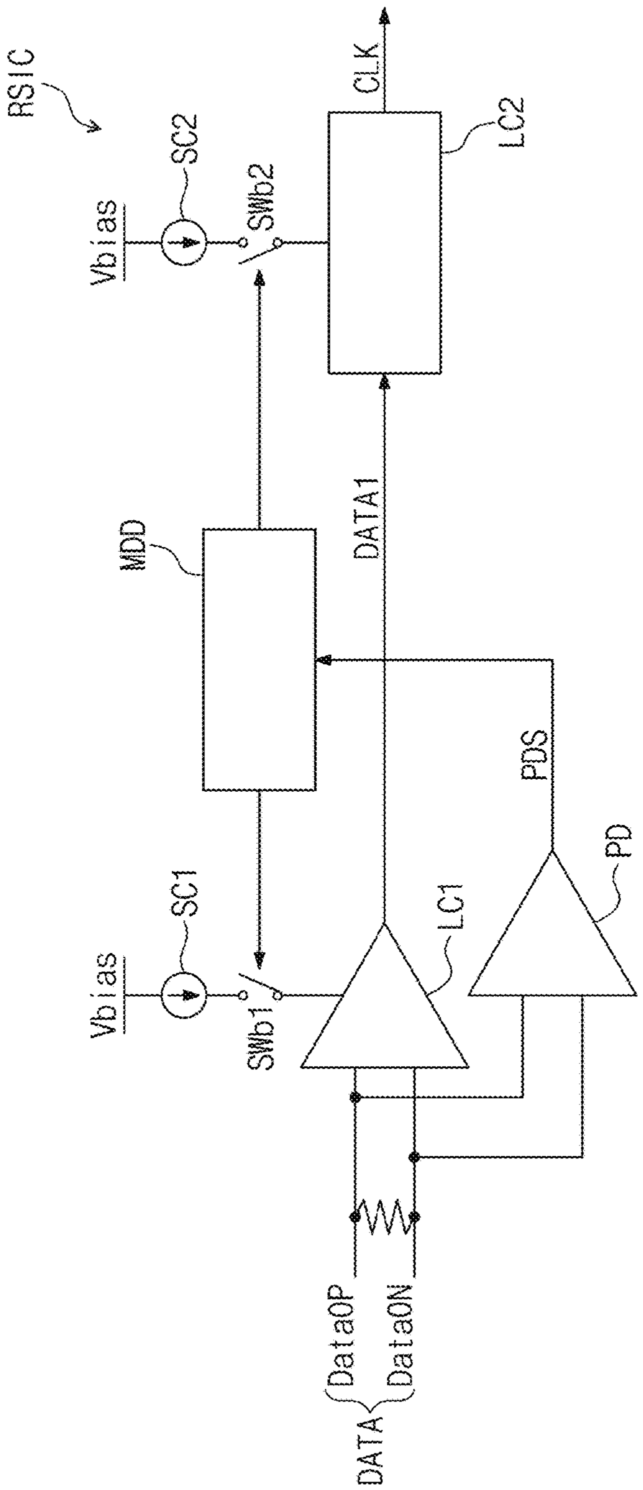
FIG. 8A is a circuit diagram of a driving chip according to an embodiment of the present disclosure.
Figure 8B:
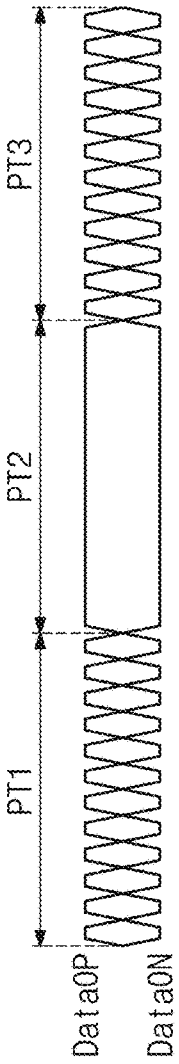
FIG. 8B is a waveform diagram of data signals applied to a driving chip according to an embodiment of the present disclosure.

FIG. 8A is a circuit diagram of the driving chip RSIC according to an embodiment of the present disclosure. FIG. 8B is a waveform diagram of data signals DATA0P and DATA0N applied to the driving chip RSIC according to an embodiment of the present disclosure.

Referring to FIG. 8A, the driving chip RSIC may include an analog front-ends (hereinafter, referred to as "AFE") circuit LC1, a pattern detector PD, a clock data recovery (hereinafter, referred to as "CDR") circuit LC2, a mode determiner MDD, a first switch SWb1, and a second switch SWb2.

The driving chip RSIC may receive the output image signal DATA from the control circuit 100 (refer to FIG. 4). The output image signal DATA may include a pair of data DATA0P and DATA0N and may be transmitted in the form of the pair of data DATA0P and DATA0N to the driving chip RSIC. As an example, the AFE circuit LC1 may convert the pair of data DATA0P and DATA0N applied thereto from the outside to output a data signal DATA1. The CDR circuit LC2 may receive the data signal DATA1 from the AFE circuit LC1. The CDR circuit LC2 may extract or restore a clock signal CLK from the converted data signal DATA1.

The first switch SWb1 may be electrically connected to the AFE circuit LC1, and the second switch SWb2 may be electrically connected to the CDR circuit LC2. As an example, the first switch SWb1 may be connected between the AFE circuit LC1 and a first current source SC1 connected to a bias voltage Vbias, and the second switch SWb2 may be connected between the CDR circuit LC2 and a second current source SC2 connected to the bias voltage Vbias. Accordingly, the first switch SWb1 and the second switch SWb2 may control the transmission of the bias voltage Vbias to drive the AFE circuit LC1 and the CDR circuit LC2.

Referring to FIGS. 8A and 8B, the pattern detector PD may detect a pattern of the pair of data DATA0P and DATA0N provided thereto from the outside. As an example, the pattern detector PD may apply a signal PDS that includes information on whether the pair of data DATA0P and DATA0N from the outside is a first pattern PT1, a second pattern PT2, or a third pattern PT3 to the mode determiner MDD.

The mode determiner MDD may turn on or turn off the first switch SWb1 and the second switch SWb2 based on the signal PDS. As an example, the first pattern PT1 may be a normal pattern. Accordingly, when the first pattern PT1 is received, the display panel DP may be driven in a normal driving mode, i.e., the first mode. Therefore, when it is determined that the first pattern PT1 is detected, the mode determiner MDD may turn on the first switch SWb1 and the second switch SWb2.

The second pattern PT2 may have a form in which the data voltage does not change for a certain period of time compared to the first pattern PT1. When the second pattern PT2 is received, the display panel DP may be driven in a low consumption mode, i.e., the second mode. When it is determined that the second pattern PT2 is detected, the mode determiner MDD may turn off the first switch SWb1 and the second switch SWb2.

The third pattern PT3 may be substantially the same as the first pattern PT1. When the third pattern PT3 is input, the display panel DP may start to be driven again in the first mode. Accordingly, the third pattern PT3 may be referred to as a wake-up pattern that indicates the operation of the first mode. When it is determined that the third pattern PT3 is detected, the mode determiner MDD may turn on the first switch SWb1 and the second switch SWb2.

The driving chip RSIC may be selectively driven in the first mode or the second mode. The first mode may be the driving mode of the display panel DP when the first pattern PT1 or the third pattern PT3 is detected. The second mode may be the driving mode of the display panel DP when the second pattern PT2 is sensed.

In the first mode, the first switch SWb1 and the second switch SWb2 may be turned on, and the bias voltage Vbias may be applied to drive the driving chip RSIC. In the second mode, the first switch SWb1 and the second switch SWb2 may be turned off, and the bias voltage Vbias to drive the driving chip RSIC may not be applied. Accordingly, some of the power supplies provided to the driving chip RSIC may be blocked in the second mode, and thus, the power consumption may be effectively reduced.

Referring to FIGS. 6A, 8A, and 8B, when the power supply for the driving chip RSIC is turned off in the second mode, the data lines DL1 to DLm may receive the predetermined voltage VCOM from the power supply chip PIC. In this case, even though there is the certain output difference between the driving chips RSIC, the difference in data voltage of the display panel DP may be reduced since the display panel DP receives the common voltage from the power supply chip PIC while being driven in the second mode.

Figure 9A:
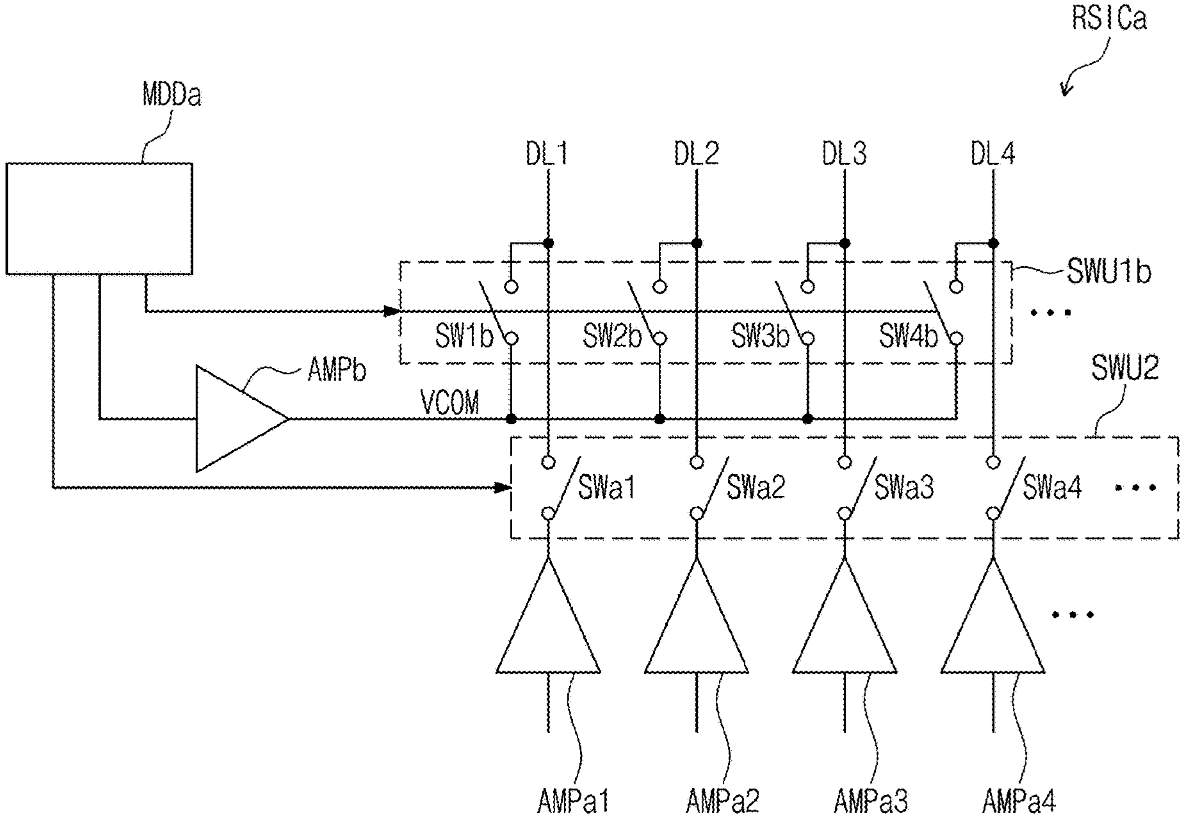
FIG. 9A is a circuit diagram of a driving chip according to an embodiment of the present disclosure.

FIG. 9A is a circuit diagram of a driving chip RSICa according to an embodiment of the present disclosure.

Referring to FIG. 9A, the driving chip RSICa may include a mode determiner MDDa, a first amplifier AMPb, a plurality of second amplifiers AMPa1, AMPa2, AMPa3, and AMPa4, a first switch part SWU1*b*, and a second switch part SWU2.

The first switch part SWU1*b* may include first switches SW1*b*, SW2*b*, SW3*b*, and SW4*b*. The second switch part SWU2 may include second switches SWa1, SWa2, SWa3, and SWa4.

FIG. 9A shows four data lines DL1, DL2, DL3, and DL4 and four first switches SW1*b*, SW2*b*, SW3*b*, and SW4*b* as a representative example. Each of the first switches SW1*b*, SW2*b*, SW3*b*, and SW4*b* may be disposed between the first amplifier AMPb and a corresponding data line among the data lines DL1, DL2, DL3, and DL4.

The number of the first switches SW1*b*, SW2*b*, SW3*b*, and SW4*b* may be the same as the number of the data lines DL1, DL2, DL3, and DL4. As an example, FIG. 9A shows only four data lines DL1, DL2, DL3, and DL4, however, the display panel DP may include m data lines DL1 to DLm as shown in FIG. 4. Accordingly, the number of the first switches may be the same as the number of the data lines electrically connected to one driving chip RSICa. As an example, in a case where one driving chip RSICa is connected to one display panel DP, the number of the first switches may be "m", and in a case where multiple driving chips RSICa are connected to one display panel DP, the number of the first switches may be the same as the number of the data lines electrically connected to the one driving chip RSICa.

FIG. 9A shows the second switches SW1*a*, SW2*a*, SW3*a*, and SW4*a* electrically connected to the four data lines DL1, DL2, DL3, and DL4 in a one-to-one correspondence and the second amplifiers AMPa1, AMPa2, AMPa3, and AMPa4 electrically connected to the second switches SW1*a*, SW2*a*, SW3*a*, and SW4*a* in a one-to-one correspondence as a representative example. The second switches SW1*a*, SW2*a*, SW3*a*, and SW4*a* may be disposed between the second amplifiers AMPa1, AMPa2, AMPa3, and AMPa4 and the data lines DL1, DL2, DL3, and DL4, respectively.

The number of the second amplifiers AMPa1, AMPa2, AMPa3, and AMPa4 and the number of the second switches SW1*a*, SW2*a*, SW3*a*, and SW4*a* may be the same as the number of the data lines DL1, DL2, DL3, and DL4. As an example, FIG. 9A shows only four data lines DL1, DL2, DL3, and DL4, however, the display panel DP may include m data lines DL1 to DLm as shown in FIG. 4. Accordingly, the number of the second amplifiers and the number of the second switches may be the same as the number of the data lines electrically connected to the driving chip RSICa.

The data lines DL1, DL2, DL3, and DL4 may receive the data voltages from the second amplifiers AMPa1, AMPa2, AMPa3, and AMPa4, respectively, in the first mode and may receive the predetermined voltage VCOM from the first amplifier AMPb in the second mode.

Referring to FIGS. 8A, 8B, and 9A, the mode determiner MDDa shown in FIG. 9A may determine whether the pair of data DATA0P and DATA0N from the outside is the first pattern PT1, the second pattern PT2, or the third pattern PT3. The mode determiner MDDa may control an operation of the first switch part SWU1*b* and the second switch part SWU2 based on the determined result.

When the first pattern PT1 and the third pattern PT3 are detected, the mode determiner MDDa may turn off the first switch part SWU1*b* and may turn on the second switch part SWU2. In this case, the data lines DL1, DL2, DL3, and DL4 of the display panel DP may receive the data voltages from the second amplifiers AMPa1, AMPa2, AMPa3, and AMPa4, respectively, and the display panel DP may be driven in the first mode.

When the second pattern PT2 is detected, the mode determiner MDDa may turn on the first switch part SWU1*b* and may turn off the second switch part SWU2. In this case, the data lines DL1, DL2, DL3, and DL4 of the display panel DP may receive the predetermined voltage VCOM from the first amplifier AMPb, and the display panel DP may be driven in the second mode.

According to an embodiment, in the first mode, the first switch part SWU1*b* may be turned off, the second switch part SWU2 may be turned on, and the data voltages may be output from the second amplifiers AMPa1, AMPa2, AMPa3, and AMPa4, respectively. In this case, not all the switches in the second switch part SWU2 are required to be turned on, and only some switches in the second switch part SWU2 may be turned on sequentially. Accordingly, only some of the data lines DL1, DL2, DL3, and DL4 may receive the data voltages.

In the second mode, the first switch part SWU1*b* may be turned on, the second switch part SWU2 may be turned off, and the predetermined voltage VCOM may be output from the first amplifier AMPb. According to an embodiment, all the switches of the first switch part SWU1*b* may be turned on, and the data lines DL1, DL2, DL3, and DL4 may receive the same predetermined voltage VCOM, however, the present disclosure should not be particularly limited. As an example, at least only a portion of the switches of the first switch part SWU1*b* may be turned on, and thus, only a portion of the data lines DL1, DL2, DL3, and DL4 may receive the predetermined voltages VCOM.

In the second mode, the first amplifier AMPb may operate, and the second amplifiers AMPa1, AMPa2, AMPa3, and AMPa4 may not operate. That is, the power may not be consumed to drive the second amplifiers AMPa1, AMPa2, AMPa3, and AMPa4. Accordingly, the second mode may be a low-power mode in which the power consumption of the electronic device 1000 (refer to FIG. 6A) is effectively reduced compared to the first mode.

Figure 9B:
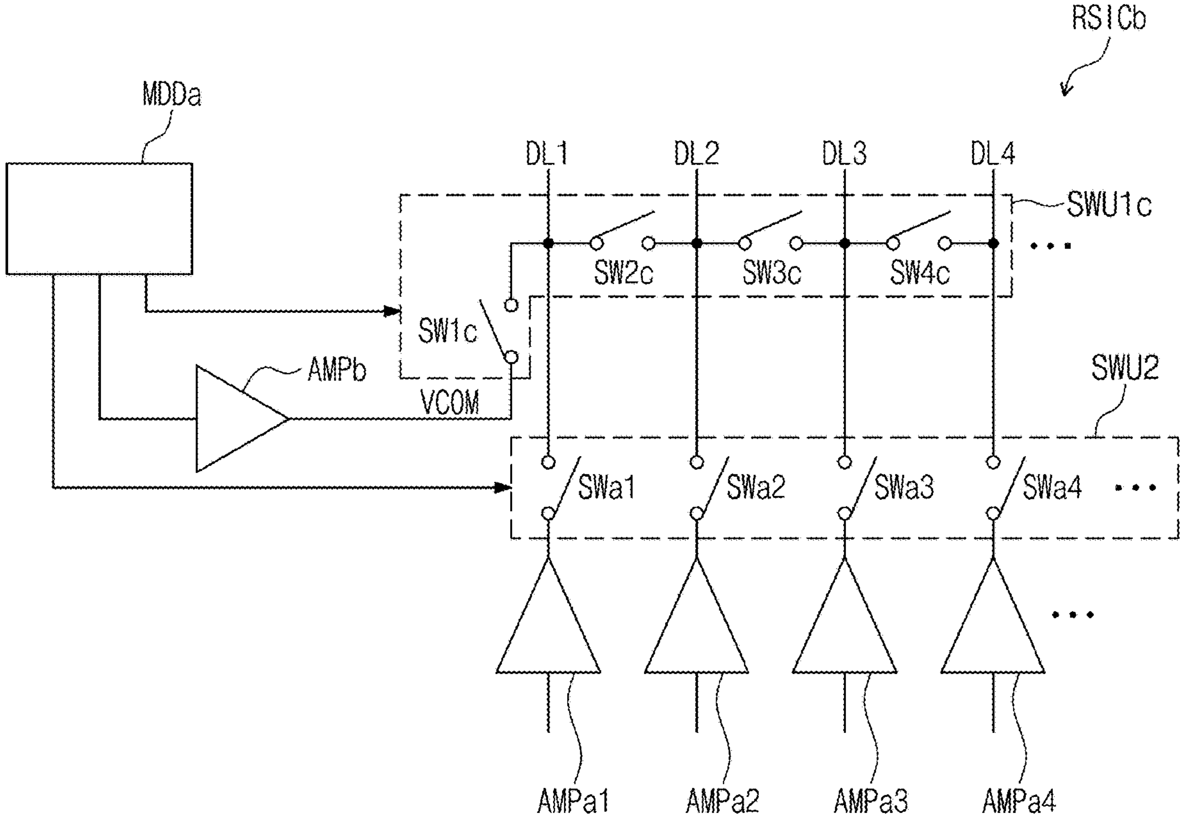
FIG. 9B is a circuit diagram of a driving chip according to an embodiment of the present disclosure.

FIG. 9B is a circuit diagram of a driving chip RSICb according to an embodiment of the present disclosure.

In FIG. 9B, the same reference numerals denote the same elements in FIG. 9A, and thus, detailed descriptions of the same elements will be omitted.

Referring to FIG. 9B, the driving chip RSICb may include a mode determiner MDDa, a first amplifier AMPb, a plurality of second amplifiers AMPa1, AMPa2, AMPa3, and AMPa4, a first switch part SWU1*c*, and a second switch part SWU2.

The first switch part SWU1*c* may include first switches SW1*c*, SW2*c*, SW3*c*, and SW4*c*.

FIG. 9B shows four first switches SW1*c*, SW2*c*, SW3*c*, and SW4*c* as a representative example. The first switches SW1*c*, SW2*c*, SW3*c*, and SW4*c* may be disposed between the first amplifier AMPb and the data lines DL1, DL2, DL3, and DL4. In detail, the first switch SW1*c* may be disposed between the first amplifier AMPb and a first data line DL1, the second switch SW2*c* may be disposed between the first data line DL1 and a second data line DL2, the third switch SW3*c* may be disposed between the second data line DL2 and a third data line DL3, and the fourth switch SW4*c* may be disposed between the third data line DL3 and a fourth data line DL4.

The number of the first switches SW1*c*, SW2*c*, SW3*c*, and SW4*c* may be the same as the number of the data lines DL1, DL2, DL3, and DL4. As an example, FIG. 9B shows only four first switches SW1*c*, SW2*c*, SW3*c*, and SW4*c*, however, the number of the first switches SW1*c*, SW2*c*, SW3*c*, and SW4*c* may be the same as the number of the data lines electrically connected to one driving chip RSICb.

As shown in FIG. 9B, the first amplifier AMPb may be electrically connected to each of the data lines DL1, DL2, DL3, and DL4 through the first switch part SWU1*c*. A predetermined voltage VCOM output from the first amplifier AMPb may be applied to the data lines DL1, DL2, DL3, and DL4 via the first switch part SWU1*c*. In this case, the predetermined voltages VCOM applied to the data lines DL1, DL2, DL3, and DL4 may have the same voltage level as each other.

The first switches SW1*c*, SW2*c*, SW3*c*, and SW4*c* of the first switch part SWU1*c* may be substantially simultaneously turned on or turned off.

In the first mode, the first switch part SWU1*c* may be turned off, the second switch part SWU2 may be turned on, and the data voltages may be output from the second amplifiers AMPa1, AMPa2, AMPa3, and AMPa4, respectively. In this case, not all the switches of the second switch part SWU2 are required to be turned on, and only some of the switches of the second switch part SWU2 may be sequentially turned on.

In the second mode, all the switches of the first switch part SWU1*c* may be turned on, all the switches of the second switch part SWU2 may be turned off, and the predetermined voltage VCOM may be output from the first amplifier AMPb. According to an embodiment, all the switches of the first switch part SWU1*c* may be turned on, and the data lines DL1, DL2, DL3, and DL4 may receive the same predetermined voltage VCOM.

The first switch part SWU1*b* shown in FIG. 9A may control the transmission of the predetermined voltage VCOM output from the first amplifier AMPb to each of the data lines DL1, DL2, DL3, and DL4. Since the switches of the first switch part SWU1*c* shown in FIG. 9B are substantially simultaneously controlled, the predetermined voltage VCOM output from the first amplifier AMPb may be commonly transmitted to the data lines DL1, DL2, DL3, and DL4.

Figure 10:
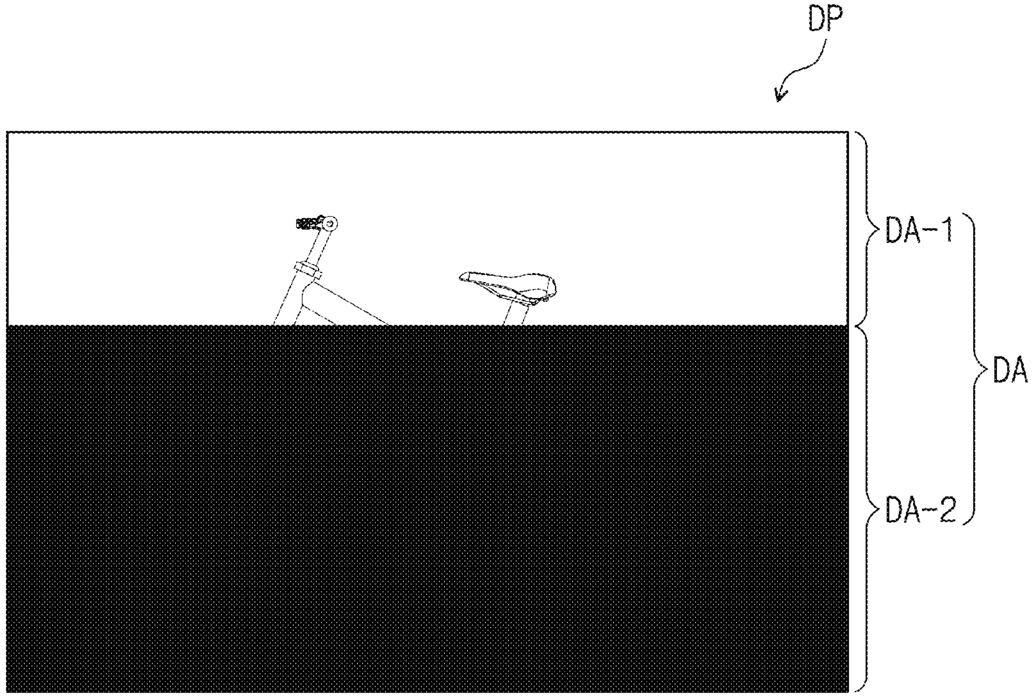
FIG. 10 is a view of a driving mode of a display panel according to an embodiment of the present disclosure.

FIG. 10 is a view of a driving mode of the display panel DP according to an embodiment of the present disclosure.

Referring to FIGS. 3 and 10, the display panel DP may be applied to the rollable electronic device 1000-2. The display panel DP may be selectively driven in the first mode or the second mode. As shown in FIG. 10, a portion of the display area DA of the display panel DP may be driven in the first mode and the other portion of the display area DA may be driven in the second mode.

The display area DA of the display panel DP may include a first area DA-1 and a second area DA-2. As an example, the display area DA may be divided into the first area DA-1 and the second area DA-2 as the display panel DP is selectively driven in the first mode or the second mode.

The first area DA-1 may be an area in which the display panel DP is driven in the first mode. In the first mode, the data lines DL1 to DLm may receive the data voltages from the second amplifiers AMPa1, AMPa2, AMPa3, and AMPa4 (refer to FIG. 9A) of the driving chips RSIC to display the image. In this case, the first area DA-1 may be an area exposed to the outside of the housing HS to display the image.

The second area DA-2 may be an area in which the display panel DP is driven in the second mode. The second area DA-2 may be an area disposed inside the housing HS not to display the image or may be an area to which a predetermined common voltage is applied while being exposed to the outside of the housing HS.

In the second mode, the data lines DL1 to DLm (refer to FIG. 6A) may receive the predetermined voltage from the power supply chip PIC (refer to FIG. 6A) or may receive the predetermined voltage from the first amplifier AMPb (refer to FIG. 9A) of the driving chips RSICa (refer to FIG. 9A). Accordingly, when the display panel DP is driven in the second mode, the second amplifiers AMPa1, AMPa2, AMPa3, and AMPa4 (refer to FIG. 9A) of the driving chips RSICa (refer to FIG. 9A) may be turned off or may be driven in the low-power mode. Accordingly, the power consumption of the electronic device 1000-2 may be effectively reduced.

Figure 11:
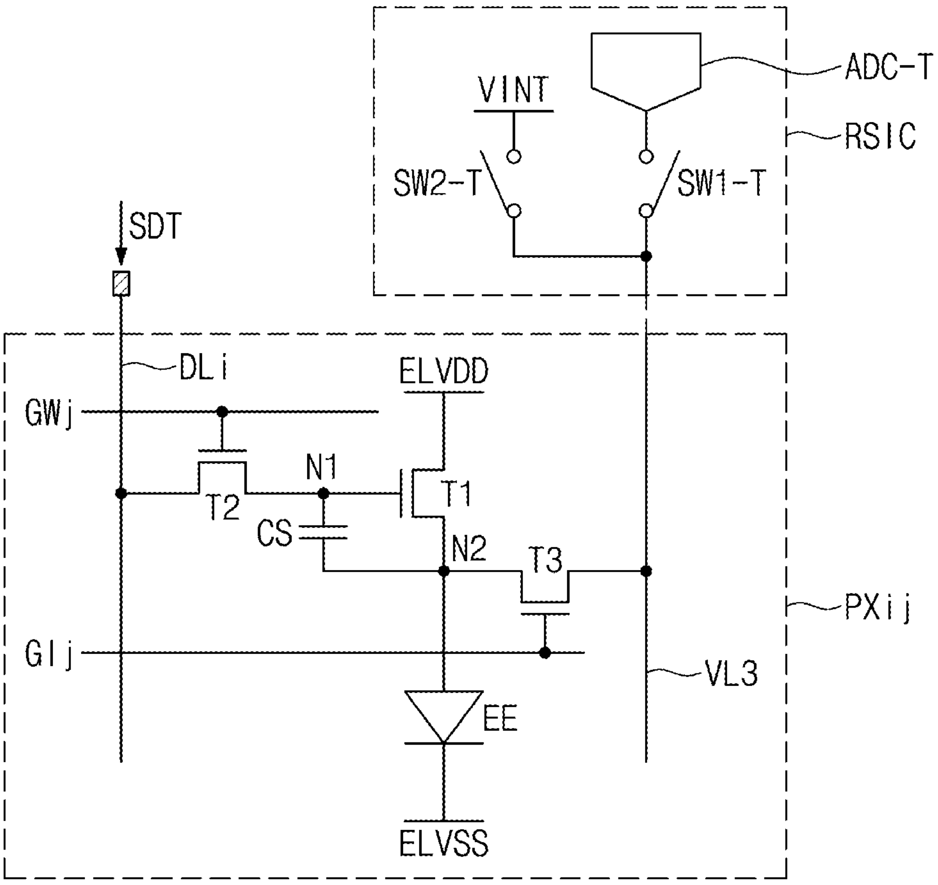
FIG. 11 is a view illustrating an operation of a pixel and a driving chip according to an embodiment of the present disclosure.

FIG. 11 is a view illustrating an operation of the pixel PXij and the driving chip RSIC according to an embodiment of the present disclosure.

Referring to FIG. 11, the driving chip RSIC may include an analog-to-digital converter ADC-T, a first switch SW1-T, and a second switch SW2-T. The first switch SW1-T may be electrically connected between the analog-to-digital converter ADC-T and the pixel PXij, and the second switch SW2-T may be electrically connected between a terminal to which the initialization voltage VINT is provided and the pixel PXij. In this case, the third driving voltage line VL3 may transmit the initialization voltage VINT to the pixel PXij.

In a sensing initialization operation, the gate signal GIj may be activated and the second switch SW2-T may be turned on. In this case, the initialization voltage VINT may be applied to the second node N2 through the third thin film transistor T3.

In a sensing mode, the gate signal GWj may be activated, and a data voltage SDT may be applied to the first node N1 through the second thin film transistor T2. In this case, the data voltage SDT may be a voltage to sense a threshold voltage of the first thin film transistor T1.

In the sensing mode, the first thin film transistor T1 may be turned on by the data voltage SDT applied to the first node N1 and the initialization voltage VINT applied to the second node N2 in the sensing initialization operation.

In addition, the gate signal GIj may also be activated in the sensing mode, and thus, the third thin film transistor T3 and the first switch SW1-T may be turned on. Accordingly, the analog-to-digital converter ADC-T may receive a signal of the second node N2 through the third thin film transistor T3.

The analog-to-digital converter ADC-T may covert the signal of the second node N2 to a digital sensing signal to sense the threshold voltage of the first thin film transistor T1.

Referring to FIGS. 6A and 9A, the data voltage SDT may be commonly provided to the data lines DL1 to DLm from the power supply chip PIC. Accordingly, when sensing the threshold voltage, the certain output difference between the driving chips RSIC may not be considered. Accordingly, the accuracy of a measurement value of the threshold voltage for each pixel PXij may be effectively improved, and as a result, a compensation accuracy based on the measured threshold voltage may be effectively improved. Accordingly, the display quality of the electronic device 1000 may be improved.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present invention shall be determined according to the attached claims.

What is claimed is:

1. An electronic device comprising:
a display panel; and
a data driver configured to output a plurality of data voltages to the display panel, the display panel comprising:
a plurality of pixels; and
a plurality of data lines electrically connected to the plurality of pixels,
wherein the display panel is selectively driven in a first mode or a second mode,
the plurality of data lines are configured to receive the plurality of data voltages, respectively, from the data driver in the first mode,
the display panel or the data driver comprises a switch part electrically connected to the plurality of data lines, and
the plurality of data lines are configured to receive a predetermined voltage through the switch part in the second mode;
wherein the data driver comprises:
a first amplifier electrically connected to all of the plurality of data lines through a plurality of first switches;
a plurality of second amplifiers electrically connected to the plurality of data lines, respectively; and
a plurality of second switches disposed between the plurality of data lines and the plurality of second amplifiers, respectively;
wherein the plurality of data voltages are output from the plurality of second amplifiers and applied to the plurality of data lines, respectively, in the first mode, and the predetermined voltage is output from the first amplifier and applied to at least a portion of the plurality of data lines in the second mode.

2. The electronic device of claim 1, further comprising:
a power supply chip configured to provide the predetermined voltage to the display panel; and
a power supply line to which the predetermined voltage is applied from the power supply chip,
wherein the power supply chip is electrically connected to the power supply line.

3. The electronic device of claim 2, wherein the display panel comprises a display area in which the plurality of pixels are arranged and a non-display area adjacent to the display area, and
the power supply line is disposed in the non-display area to surround at least a portion of the display area and is electrically connected to one end of each of the plurality of data lines.

4. The electronic device of claim 2, wherein the plurality of data lines comprise a plurality of first ends, respectively, and a plurality of second ends opposite to the plurality of first ends, respectively,
the plurality of data voltages are applied to the plurality of data lines through the plurality of first ends, respectively, in the first mode, and
the predetermined voltage is applied to the plurality of data lines through the plurality of second ends in the second mode.

5. The electronic device of claim 2, wherein the switch part is provided in the display panel and comprises a plurality of switches electrically connected to one end of each of the plurality of data lines,
the display panel further comprises at least one control line to control an operation of the plurality of switches,
the plurality of switches are turned off in the first mode, and
the plurality of switches are turned on in the second mode to allow the power supply line to be electrically connected to the plurality of data lines via the plurality of switches.

6. The electronic device of claim 2, wherein the data driver comprises:
a plurality of amplifiers connected to the plurality of data lines, respectively; and
a plurality of switches disposed on paths through which the plurality of data lines are connected to the plurality of amplifiers, respectively.

7. The electronic device of claim 6, wherein the plurality of switches of the data driver are turned on in the first mode, and the plurality of switches of the data driver are turned off in the second mode.

8. The electronic device of claim 7, wherein the data driver is turned off in the second mode.

9. The electronic device of claim 1, wherein the switch part is provided in the data driver and comprises the plurality of first switches electrically connected to the plurality of data lines, respectively, and
the plurality of data lines are configured to receive the predetermined voltage through the plurality of first switches.

10. The electronic device of claim 1, wherein the plurality of first switches of the data driver are turned off in the first mode, the plurality of second switches are turned on in the first mode,
the plurality of first switches of the data driver are turned on in the second mode, and the plurality of second switches are turned off in the second mode.

11. The electronic device of claim 1, further comprising:
a plurality of driving chips,
wherein the data driver is disposed in each of the plurality of driving chips.

12. An electronic device comprising:

a display panel configured to operate in a first mode or a second mode different from the first mode; and a data driver configured to receive an output image signal and comprising a mode determiner configured to determine an operation mode of the display panel, the display panel comprising:

a plurality of pixels; and a plurality of data lines electrically connected to the plurality of pixels, wherein the plurality of data lines are configured to receive a plurality of data voltages, respectively, from the data driver in the first mode, and at least a portion of the plurality of data lines is configured to receive a predetermined voltage in the second mode;

wherein the data driver comprises:

a first switch part electrically connected to the plurality of data lines;

a first amplifier electrically connected to the plurality of data lines through the first switch part;

a plurality of second amplifiers electrically connected to the plurality of data lines, respectively; and a second switch part disposed between the plurality of data lines and the plurality of second amplifiers, wherein the plurality of data voltages are output from the second amplifiers and applied to the plurality of data lines, respectively, in the first mode, and the predetermined voltage is output from the first amplifier and applied to the at least a portion of the plurality of data lines in the second mode.

13. The electronic device of claim 12, further comprising a power supply chip electrically connected to the display panel and configured to provide the predetermined voltage.

14. The electronic device of claim 13, wherein the display panel further comprises:

a switch part electrically connected to the plurality of data lines; and a power supply line configured to receive the predetermined voltage from the power supply chip, wherein the switch part is configured to control a connection between the power supply line and the plurality of data lines.

15. The electronic device of claim 14, wherein the data driver further comprises:

a plurality of amplifiers connected to the plurality of data lines, respectively; and a plurality of switches disposed on paths through which the plurality of data lines are connected to the plurality of amplifiers, respectively.

16. The electronic device of claim 15, wherein the switch part is turned off in the first mode, the plurality of switches are turned on in the first mode, the plurality of data lines receive the plurality of data voltages from the plurality of amplifiers, respectively, in the first mode, the switch part is turned on in the second mode, the plurality of switches are turned off in the second mode, and the plurality of data lines receive the predetermined voltage from the power supply chip in the second mode.

17. The electronic device of claim 12, wherein the first switch part is turned off in the first mode, the second switch part is turned on in the first mode, the first switch part is turned on in the second mode, and the second switch part is turned off in the second mode.

* * * * *